US008763586B2

(12) United States Patent
Ouwenga et al.

(10) Patent No.: US 8,763,586 B2
(45) Date of Patent: *Jul. 1, 2014

(54) SUPERCHARGER WITH CONTINUOUSLY VARIABLE DRIVE SYSTEM

(71) Applicant: Eaton Corporation, Cleveland, OH (US)

(72) Inventors: Daniel Robert Ouwenga, Portage, MI (US); Karen E. Bevan, Northville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,876

(22) Filed: May 27, 2013

(65) Prior Publication Data
US 2013/0255627 A1 Oct. 3, 2013

Related U.S. Application Data

(63) Continuation of application No. 12/712,187, filed on Feb. 24, 2010, now Pat. No. 8,469,000.

(51) Int. Cl.
*F02D 9/00* (2006.01)
*F02M 25/07* (2006.01)

(52) U.S. Cl.
USPC .............. 123/337; 123/559.1; 123/568.11

(58) Field of Classification Search
CPC ........ F02B 33/446; F02B 37/04; F02B 37/10; F02B 39/04; F02B 39/10; F02B 39/12; F02B 43/10; F02D 9/00; F02D 9/1095; F02D 11/10; F02D 2041/001; F02D 31/005; F02D 41/1441; F02M 3/062; F02M 25/0707; F02M 25/0718; F02M 31/10013; F01N 13/02; F01N 3/0842; F02C 7/36; B60K 3/04; B60W 10/06; F16H 59/32; F16H 61/12; F16H 61/6648
USPC .............. 123/3, 336, 337, 348, 559.1, 559.3, 123/568.1, 41.11, 339.1, 339.23, 561, 123/564–566; 60/274, 276, 278, 285, 287, 60/607–609; 477/30–34, 37, 43
See application file for complete search history.

(56) References Cited

U.S. PATENT DOCUMENTS 3,270,730 A * 9/1966 Timoney ................ 123/561
3,279,447 A 10/1966 Barnett et al.
(Continued)

FOREIGN PATENT DOCUMENTS

GB 1 005 350 9/1965
GB 2 230 816 10/1990
(Continued)

OTHER PUBLICATIONS

International Search Report for PCT/IB2011/000377 mailed Aug. 31, 2011, pp. 1-4.
(Continued)

*Primary Examiner* — John Kwon
*Assistant Examiner* — Johnny Hoang
(74) *Attorney, Agent, or Firm* — Mei & Mark LLP

(57) ABSTRACT

An engine system includes a throttle valve configured to variably open and close to selectively restrict a volume of air flow. The engine system also includes a supercharger comprising an air inlet, an air outlet, a rotatable drive shaft and rotors associated with the drive shaft, wherein the supercharger is sized to have a flow rate that substantially prevents backwards leaking of air flow. The engine system further includes a combustion engine comprising combustion chambers and an associated rotatable crank shaft and a continuously variable transmission (CVT) configured to variably transfer rotational energy between the drive shaft and the crank shaft.

10 Claims, 15 Drawing Sheets

(56) References Cited

U.S. PATENT DOCUMENTS

| | | | |
|---|---|---|---|
| 4,426,985 A | | 1/1984 | Kanesaka |
| 4,505,117 A | | 3/1985 | Matsuoka |
| 4,519,373 A | | 5/1985 | Hardy et al. |
| 4,563,997 A | | 1/1986 | Aoki |
| 4,730,593 A | * | 3/1988 | Regar ............................. 123/561 |
| 4,815,437 A | | 3/1989 | Regar |
| 4,875,454 A | * | 10/1989 | Okimoto et al. ........... 123/559.3 |
| 4,996,966 A | | 3/1991 | Hitomi et al. |
| 5,117,799 A | * | 6/1992 | Suzuki et al. ................. 123/561 |
| 5,205,191 A | | 4/1993 | Takata et al. |
| 5,335,500 A | * | 8/1994 | Wunderlich et al. ............ 60/609 |
| 5,819,538 A | | 10/1998 | Lawson, Jr. |
| 5,937,831 A | | 8/1999 | Volkmann et al. |
| 6,050,094 A | | 4/2000 | Udd et al. |
| 6,058,348 A | | 5/2000 | Ohyama et al. |
| 6,273,076 B1 | | 8/2001 | Beck et al. |
| 6,318,349 B1 | | 11/2001 | Muto et al. |
| 6,343,473 B1 | | 2/2002 | Kanesaka |
| 6,354,268 B1 | | 3/2002 | Beck et al. |
| 6,474,323 B1 | | 11/2002 | Beck et al. |
| 6,678,605 B2 | | 1/2004 | Kisaka et al. |
| 6,704,639 B2 | | 3/2004 | Amano |
| 7,478,629 B2 | | 1/2009 | del Valle Bravo et al. |
| 2002/0013653 A1 | | 1/2002 | Ohyama et al. |
| 2004/0194759 A1 | | 10/2004 | Yamaoka et al. |
| 2005/0074341 A1 | | 4/2005 | Dairokuno et al. |
| 2005/0211231 A1 | | 9/2005 | Kelley, Jr. |
| 2006/0254565 A1 | * | 11/2006 | Bottcher et al. ........... 123/559.1 |
| 2007/0079805 A1 | | 4/2007 | Weber et al. |
| 2008/0256950 A1 | | 10/2008 | Park |
| 2009/0291803 A1 | * | 11/2009 | Moeller ........................ 477/110 |

FOREIGN PATENT DOCUMENTS

| | | |
|---|---|---|
| JP | 58-158320 | 9/1983 |
| JP | 62-55418 | 3/1987 |
| JP | 7-286526 | 10/1995 |
| JP | 2001-355501 | 12/2001 |
| JP | 2007-211634 | 8/2007 |

OTHER PUBLICATIONS

Written Opinion for PCT/IB2011/000377 mailed Aug. 31, 2011, pp. 1-4.

Chadwell, Christopher J., "CVT Supercharger and Hedge Enabled Efficient Downsizing for Spark Ignition Engines," Southwest Research Institute, San Antonio, TX, Oct. 7, 2009, p. 1-4.

* cited by examiner

SUPERCHARGER WITH CONTINUOUSLY VARIABLE DRIVE SYSTEM

This is a continuation of U.S. application Ser. No. 12/712,187, filed Feb. 24, 2010, which is incorporated herein by reference.

TECHNICAL FIELD

The present disclosure relates generally to positive displacement air pumps for supplying air to an engine. A control strategy utilizes a continuously variable transmission in combination with a fixed capacity supercharger.

BACKGROUND

In general, the amount of air provided to a combustion engine is proportionally related to an amount of power that the engine can provide. The power can be supplied as rotational shaft energy to a variety of devices, including vehicles such as automobiles. The engine power is related to its output shaft rotations per minute (RPM) and the torque that shaft is providing. In order to have varying output powers at a given engine RPM, the output shaft torque must vary. The output shaft torque is a function of many variables, but it is largely related to the amount of air entering the engine.

An air boosting system allows the engine to consume more air, thus resulting in the ability to make more torque at the output shaft. One such boosting system is a supercharger, which is a positive displacement air pump that comprises parallel lobed rotors. A supercharger may provide air or other gaseous matter to an internal combustion engine.

The supercharger may be combined with airflow valves to provide the exact amount of air required to the engine. Because superchargers are generally designed for a fixed volume of air, a bypass valve may also be included. The bypass valve is opened when the full amount of air flowing through the supercharger is not required by the engine. The excess air mass is then allowed to recirculate and enter the inlet of the supercharger again. Any excess air being recirculated still requires energy to pump, and thus decreases the overall efficiency of the boosting system.

Prior art systems have used fixed pulley designs having a pulley attached to a rotating crank shaft of an engine and to a rotational shaft of a supercharger. As engine RPMs increase, and thus the engine's demand for air, the fixed pulley allows the supercharger's rotors to spin faster to provide additional air. The pulley typically sets a fixed ratio between engine RPMs and the supercharger RPMs. While the fixed pulley system allows for the advantage of varying air supply, the air supplied is not always the optimal amount. In addition, the use of a fixed ratio results in a system where either the engine or the supercharger or both cannot be used to the full extent of its rated operational range, resulting in wasted capacity.

SUMMARY

In one embodiment, a engine system may comprise a throttle valve configured to variably open and close to selectively restrict a volume of air flow, a supercharger comprising an air inlet, an air outlet, a rotatable drive shaft and rotors associated with the drive shaft, a combustion engine comprising combustion chambers and an associated rotatable crank shaft, and a continuously variable transmission (CVT) configured to variably transfer rotational energy between the drive shaft and the crank shaft. The supercharger may be sized to have a flow rate that substantially prevents backwards leaking of air flow.

The engine system may be configured such that the throttle valve is open, the CVT transfers rotational energy from the crank shaft to the drive shaft such that the drive shaft rotates more per minute than the crank shaft, and the supercharger supplies a pressurized volume of air to the combustion engine.

The engine system may be configured such that the throttle valve is open, the CVT transfers rotational energy from the drive shaft to the crank shaft, the rotors receive torque, and the supercharger has a negative pressure differential from the air inlet to the air outlet.

The engine system may also be configured such that the throttle valve is partially closed, the CVT transfers rotational energy from the drive shaft to the crank shaft, the rotors receive torque, and the supercharger has a negative pressure differential from the air inlet to the air outlet.

The engine system may also comprise an exhaust gas recirculation valve, an air intake manifold, and an air exhaust manifold, wherein the air intake manifold interposes the supercharger and the engine, the air exhaust manifold receives air from the combustion engine, and the exhaust gas recirculation valve variably transmits air from the air exhaust manifold to the air intake manifold.

In another embodiment, an air transfer system may comprise a positive displacement air pump comprising an air inlet, an air outlet, at least one rotor to move air from the air inlet to the air outlet, and a drive shaft connected to the rotor to rotate the rotor, a valve comprising a variably movable air restriction plate, an engine comprising air combustion chambers and an associated crank shaft, and a CVT having means for transmitting a variable amount of rotational energy. The continuously variable transmission may be connected between the drive shaft and the crank shaft for transmitting rotational energy.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. Throughout the drawings, a line with an arrow-head denotes an air pathway.

An example of a prior art air supply and engine system can include a supercharger in fluid communication with an engine. The prior art supercharger may comprise at least one lobed rotor and associated drive shaft for accelerating a volume of air. The drive shaft may be associated with a fixed ratio pulley system. The fixed ratio pulley system may comprise a first pulley connected to the drive shaft and a second pulley associated with a crank shaft of the engine. A tension belt may be arranged on the first pulley and the second pulley to allow the transfer of rotational power from the engine crank shaft to the drive shaft. One example of a ratio of rotational power transfer is 4:1, where every one turn of the engine crank shaft results in four turns of the drive shaft. This allows the supercharger to increase the volume of air transferred by the rotor each time the engine speed increases.

Figure 1:
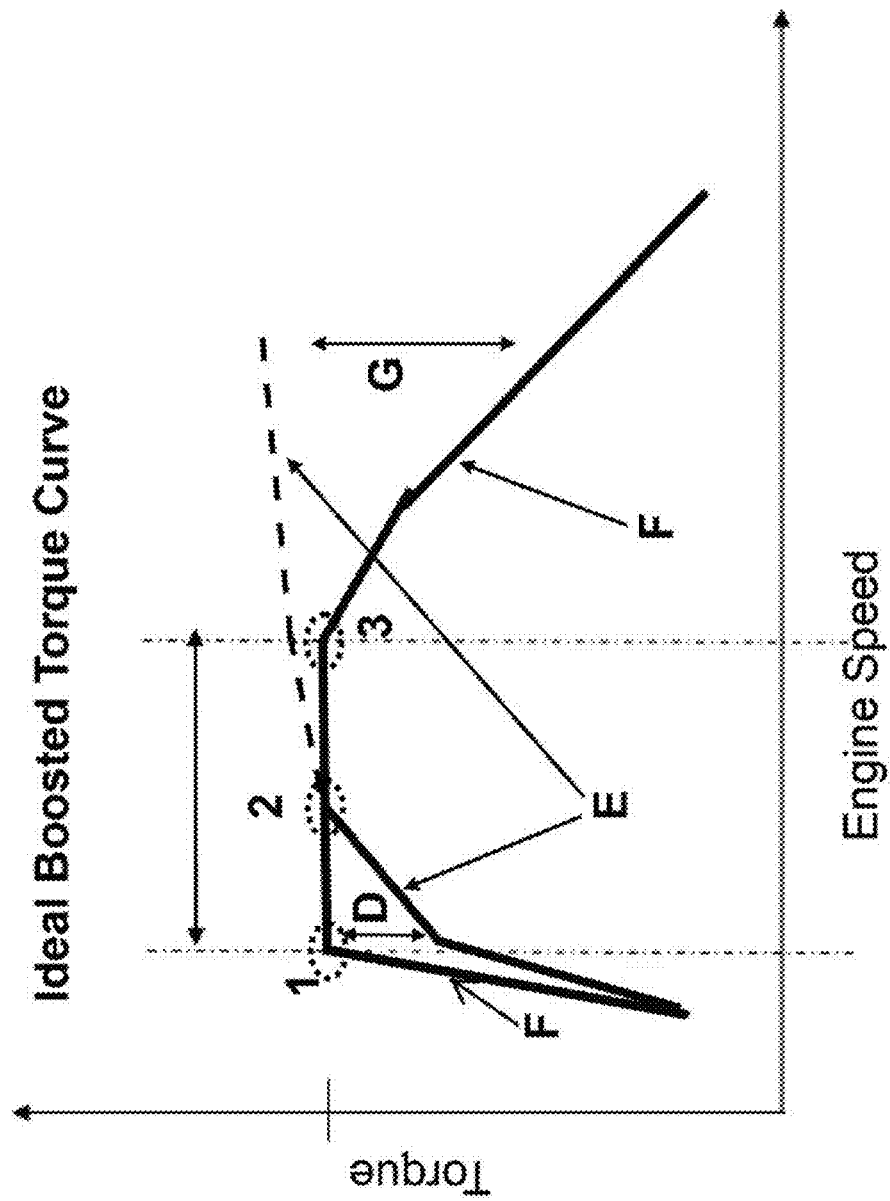
FIG. 1 is an example of an ideal boosted torque curve and a prior art torque curve.

Since the volume of air supplied to the engine directly affects the torque output of the engine, the fixed ratio pulley system supplies a predictable volume of air to the engine for a predictable increase in torque. Line E of FIG. 1 shows the torque curve for a prior art fixed pulley ratio supercharged engine. At low engine speeds, up to point 1, the transfer of energy from the engine to the supercharger is inadequate to spin the rotor fast enough for an ideal amount of torque. The difference between the ideal torque, shown on line F, and the prior art torque is shown at D. Point 1 is, for many reasons, one of the most critical points in an engine's operating range. It is the point at which a vehicle has gone from an idled condition to a moving condition, and typically is a high load condition.

To achieve the ideal torque at point 1, the supercharger must provide more air to the engine, but must not operate outside its capacity. With engine speed and supercharger speed directly related by the use of a fixed pulley system, as engine speed increases, the supercharger is at risk of overspeeding. Therefore, one cannot increase the ratio between the pulleys too much to achieve a torque near ideal at point 1, since this will cause an overspeed in the supercharger at later engine operating speeds. As a compromise, the prior art designs typically accept a decrease in torque at point 1 so that at a point 2, the system matches the ideal torque curve. Past this point, the supercharger supplies too much air, but is within its operational speed. If the air were supplied to the engine, it would cause an excessive amount of torque generation, shown at G. To avoid the excess torque, the excess air is diverted by, for example, a bypass valve to prevent oversupply of air to the combustion chamber of the engine. The bypass valve can allow recirculation of air, or an outlet for air. In either scenario, a significant amount of energy is wasted.

To achieve the ideal boosted torque curve, applicant proposes the use of a continuously variable transmission (CVT) in place of the fixed ratio pulley system. The speed of the supercharger may be controlled so that the airflow output matches the required flowrate of the engine. The variation in supercharger speed allows for more customized variations in the torque output of an internal combustion engine. The CVT may be used to control the speed of the supercharger "independent" of the engine RPM and "dependant" on desired engine airflow under the commanded conditions.

The CVT can be one of many types of devices allowing a rotational difference between the engine crank shaft and the supercharger drive shaft. A mechanical type toroid, belt, planetary, or cone CVT allows for rotational energy transfer from the crank shaft to the drive shaft. Or, the CVT can be electrical, such as an independent electric motor.

The CVT allows for a range of speeds on the drive shaft of the rotor. The speeds can be greater than or less than the rotations per minute (RPMs) on the motor. The CVT allows for a customizable air supply, and therefore, customizable torque output. A high torque output is achievable at the low engine speeds of point 1, and an optimal torque is achievable at point 2. At point 3, the supercharger can reach its peak airflow substantially simultaneously to the engine reaching its peak power. For points above point 3, the airflow can remain nearly constant. The engine output torque will decrease, yet output power will remain largely the same. Instead of the significant power waste in the area G, a power savings is achieved.

An additional benefit is achieved by using a CVT: the fuel economy can be increased more than 10% by engine downspeeding. The engine can be operated at lower engine speeds, such as 1200 RPMs, which reduces engine friction. Ideally, the engine will produce high torque at the low engine speed to maximize the downspeeding benefits. Current designs have inadequate boost, or air supply, but a CVT design allows the supercharger to supply air independent of engine speed, which increases boost at low engine speed, which translates in to increased "low end torque." With more torque at low engine speeds, longer transmission gear ratios can be used at low engine speed, resulting in further increases in fuel economy.

Yet another benefit to a supercharged engine can be achieved by using a smaller size supercharger. Prior art designs select a supercharger size based upon the airflow needed at point 2 of FIG. 1. At rotational speeds greater than point 2, supercharger efficiency is limited by internal sealing. At low rotational speeds, and thus high pressure ratios, supercharger efficiency decreases because air is internally leaking backwards, from outlet to inlet. By using a smaller supercharger to achieve the ideal airflow, less backwards leaking of air occurs. The smaller supercharger must be operated at higher rotational speeds to achieve the same airflow as a larger supercharger.

A final benefit of using the smaller supercharger in combination with the CVT is that the bypass valve can be eliminated. The CVT comprises a combination of mechanisms that allow it to seamlessly switch along a range of effective gear ratios between a minimum and maximum value. Therefore, the supercharger speed can be varied such that the supercharger will provide only the exact air required by the engine. The supercharger may be spun faster at low engine speeds to achieve high boost, and spun slower at high engine speeds to prevent overspeeding.

Controlling the CVT becomes a part of the vehicle electronics, and thus a calibration strategy is required to determine the position, speed, and functionality of the supercharger under all conditions. The calibration strategy may be implemented by, for example, a computer having a processor, memory, algorithm stored in the memory, and control electronics. The computer can also be used for controlling other devices, such as an engine, a fuel injection system, throttling components, and exhaust gas recirculation valves.

The following example further illustrates the contrast between a fixed ratio pulley design and a CVT design. A 2 L engine with a maximum speed of 6500 RPM is combined with a 0.57 L supercharger with a maximum speed of 20,000 RPM. Example 1 includes a fixed pulley with a ratio of 4:1 to transfer energy from the engine to the supercharger. Example 2 uses a CVT having a range of energy transmitting ratios.

Figure 4:
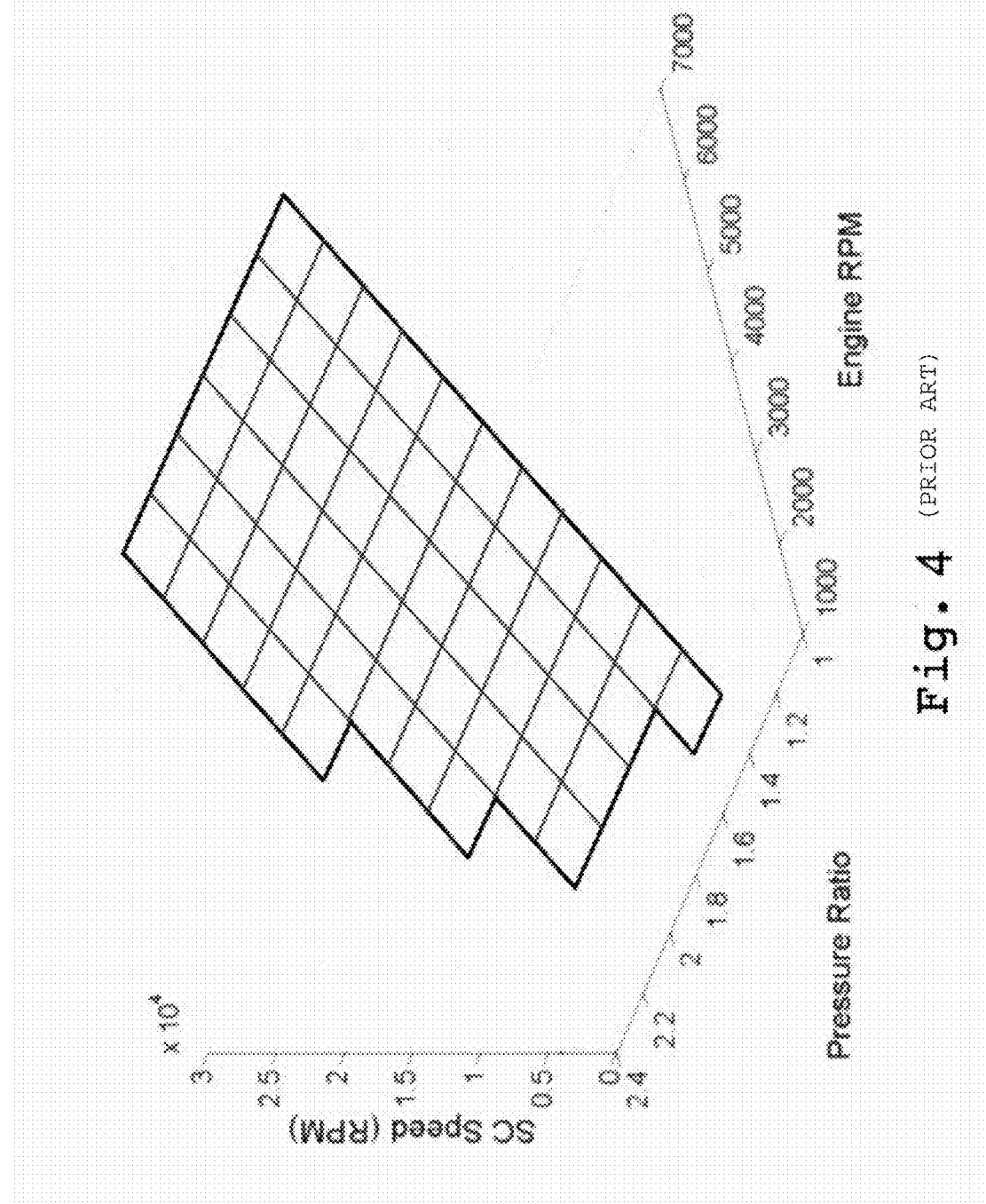
FIG. 4 is a graph of operating speed for an example of a prior art fixed pulley ratio system supercharger.

Table 1 (example 1) shows supercharger speed in RPMs for given pressure ratios (vertical) and engine speeds in RPMs (horizontal). The supercharger speed is linearly related to engine speed for the fixed ratio pulley example. When the engine is at 5000 RPMs, the supercharger is slightly over its capacity. Past an engine speed of 5500 RPMs, the supercharger is far past its limiting speed. Therefore, to protect the supercharger, the engine cannot operate past 5000 RPMs. This results in wasted capacity, as the engine is not utilized along its full operational range. Also indicated by the blank cells in Table 1, the fixed ratio pulley system cannot provide a range of pressure ratios. That is, the system cannot provide high boost at low engine RPMs. The results of Table 1 are also illustrated in FIG. 4, which plots supercharger speed in RPMs against the pressure ratio and engine speed in RPMs.

the maximum engine speed. Therefore, it is not achievable in the fixed pulley example to spin the engine above 5000 PRM without damaging the supercharger.

The same capacity supercharger in the CVT example of Table 2 has the same limiting speed, yet the pulley ratio can change to allow the supercharger to operate along its peak limiting speed over the operating range of the engine.

Most traditional spark ignition internal combustion engines utilize an airflow limiting feature such as a throttle valve in a throttle body to create a subatmospheric pressure in the intake manifold. To create the subatmospheric pressure, power is consumed.

When using a CVT in combination with a supercharger, greater operating freedom on the supercharger results in power savings. The rotors can be controlled to force air towards the engine, or to restrict air to the engine. By slowing the rotors via the CVT, therefore creating air restriction, subatmospheric inlet conditions can be created in the intake manifold with less power consumption when compared to the prior art. Slowing the rotors can be achieved via a change in the power transmission ratio of the CVT, and, as discussed in more detail below, the resultant torque created on the rotors can be supplied back the engine crank shaft for use in the system.

With the CVT driven supercharger, the CVT can slow down the lobed rotors enough to perform some or all of the necessary restriction previously provided by the throttle valve. This creates a negative pressure differential across the supercharger. The negative pressure differential will generate torque on the rotors. The drive system and engine crank shaft must resist the torque, but in general, a portion of the torque

TABLE 1

|     | 1000 | 1500 | 2000 | 2500  | 3000  | 3500  | 4000  | 4500  | 5000  | 5500  | 6000  | 6500  |
|-----|------|------|------|-------|-------|-------|-------|-------|-------|-------|-------|-------|
| 1.2 | 4100 | 6150 | 8200 | 10250 | 12300 | 14350 | 16400 | 18450 | 20500 | 22550 | 24600 | 26650 |
| 1.4 | 4100 | 6150 | 8200 | 10250 | 12300 | 14350 | 16400 | 18450 | 20500 | 22550 | 24600 | 26650 |
| 1.6 |      | 6150 | 8200 | 10250 | 12300 | 14350 | 16400 | 18450 | 20500 | 22550 | 24600 | 26650 |
| 1.8 |      | 6150 | 8200 | 10250 | 12300 | 14350 | 16400 | 18450 | 20500 | 22550 | 24600 | 26650 |
| 2.0 |      |      |      | 10250 | 12300 | 14350 | 16400 | 18450 | 20500 | 22550 | 24600 | 26650 |
| 2.2 |      |      |      |       |       |       | 16400 | 18450 | 20500 | 22550 | 24600 | 26650 |
| 2.4 |      |      |      |       |       |       |       |       |       |       |       | 26650 |

Figure 5:
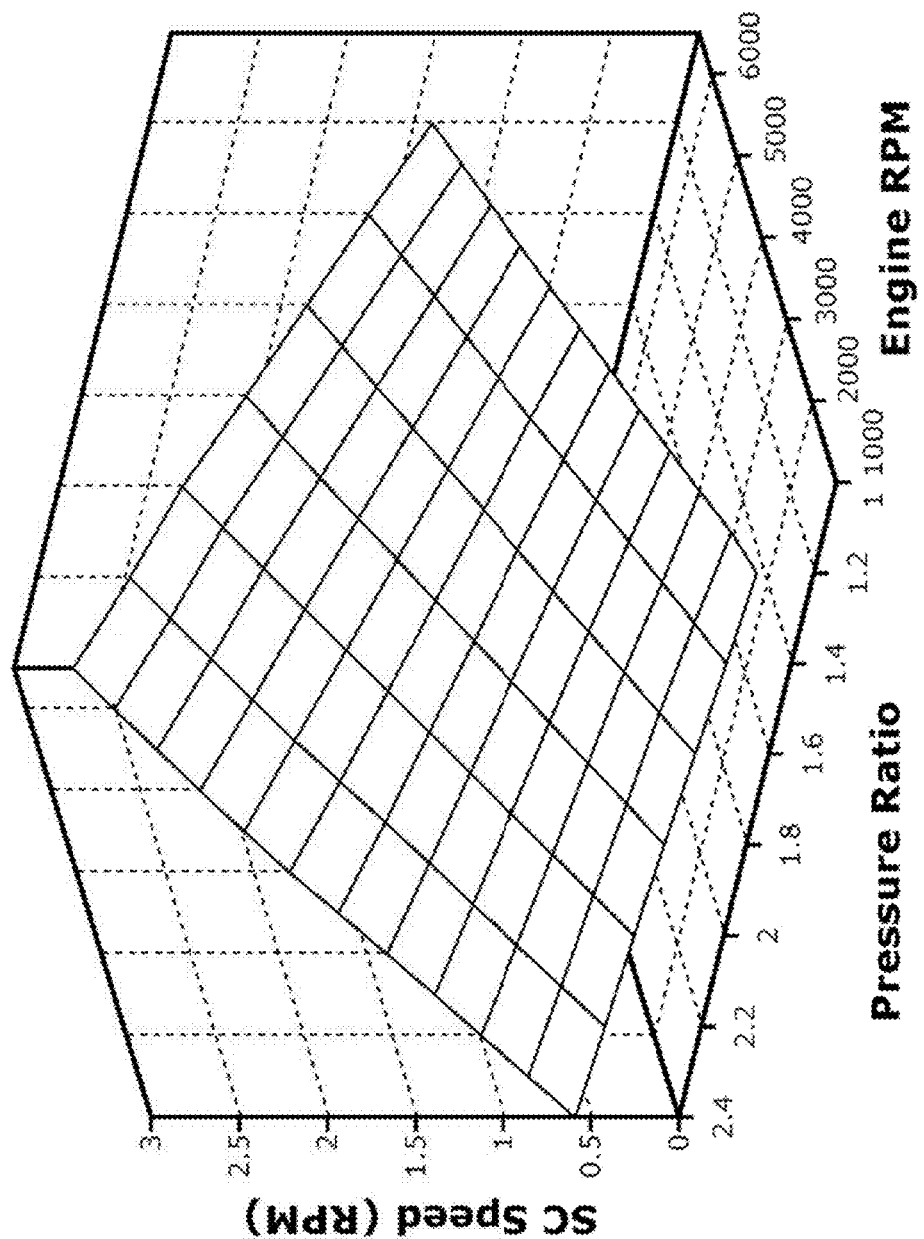
FIG. 5 is a graph of operating speed for an example of a CVT and supercharger arrangement.

Table 2 (example 2) shows that the CVT-driven supercharger speed is controlled independent of engine speed (horizontal), and that a greater range of pressure ratios (vertical) is achieved. The increased pressure ratio range allows for a greater range of boost values. In addition, the supercharger may spin faster for high boost and low engine RPMs and then spin slower for low boost and high engine RPMs. The results of Table 2 are also illustrated in FIG. 5, which plots supercharger speed in RPMs against the pressure ratio and engine speed in RPMs energy on the rotors is supplied back to the engine crank shaft. The torque transfer results in an energy gain for the system.

In addition to the power transfer benefits, the negative pressure differential is beneficial for such strategies as controlling manifold pressure to ensure adequate Exhaust Gas Recirculation (EGR). That is, the negative pressure differential helps draw air from the nearly atmospheric pressure exhaust stream, through an EGR valve, and back in to the intake stream of the engine.

TABLE 2

|     | 1000   | 1500   | 2000   | 2500    | 3000    | 3500    | 4000    | 4500    | 5000    | 5500    | 6000    | 6500    |
|-----|--------|--------|--------|---------|---------|---------|---------|---------|---------|---------|---------|---------|
| 1.2 | 3234.6 | 3994.0 | 5063.5 | 6058.7  | 7076.8  | 8047.8  | 9038.3  | 10020.2 | 11013.3 | 11990.7 | 12975.2 |         |
| 1.4 | 3691.2 | 4803.5 | 5916.0 | 7099.0  | 8245.0  | 9405.1  | 10551.7 | 11697.1 | 12833.9 | 13953.4 | 15118.7 | 13928.9 |
| 1.6 | 4190.6 | 5526.0 | 6820.7 | 8101.7  | 9429.8  | 10727.8 | 11991.5 | 13302.4 | 14611.8 | 15936.8 | 17217.3 | 16267.6 |
| 1.8 | 4682.3 | 6097.3 | 7585.4 | 9054.8  | 10512.4 | 11973.5 | 13448.2 | 14924.7 | 16407.5 | 17857.1 | 19279.4 | 18482.6 |
| 2.0 | 5083.5 | 6688.2 | 8317.5 | 9953.4  | 11602.0 | 13214.8 | 14850.5 | 16521.7 | 18170.5 | 19807.0 | 21417.5 | 20656.6 |
| 2.2 | 5474.7 | 7252.6 | 9070.3 | 10875.6 | 12659.0 | 14451.8 | 16305.2 | 18167.3 | 19858.7 | 21501.0 | 23104.5 | 24669.5 |
| 2.4 | 5859.7 | 7852.3 | 9852.1 | 11784.4 | 13786.4 | 15815.5 | 17896.1 | 19755.0 | 21546.4 | 23235.4 | 24976.8 | 26623.0 |

Figure 2A:
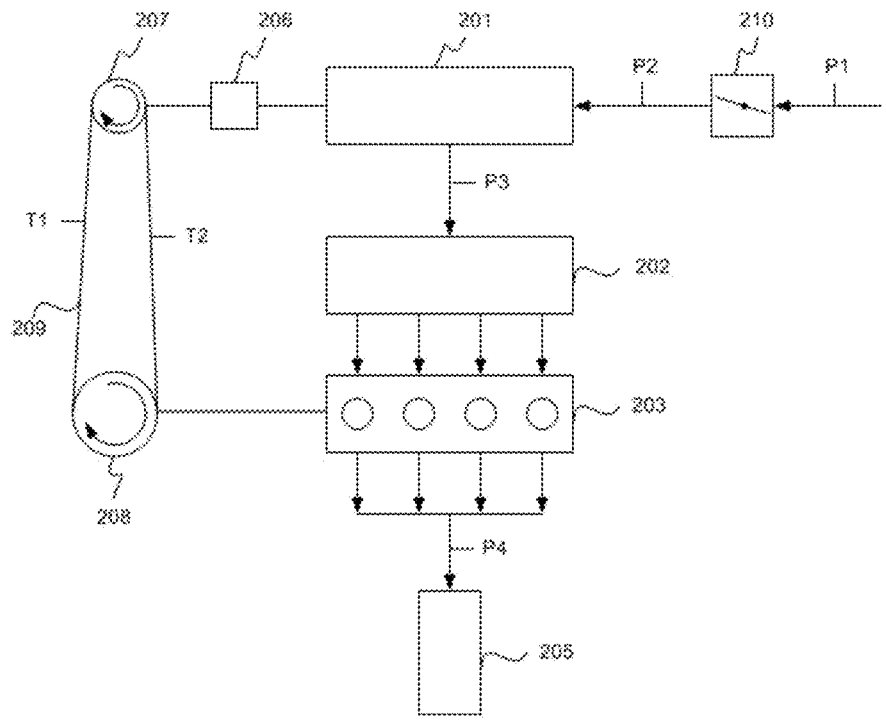
FIG. 2A is an example of an engine system with an open upstream throttle valve and a boosted air supply.
Figure 2B:
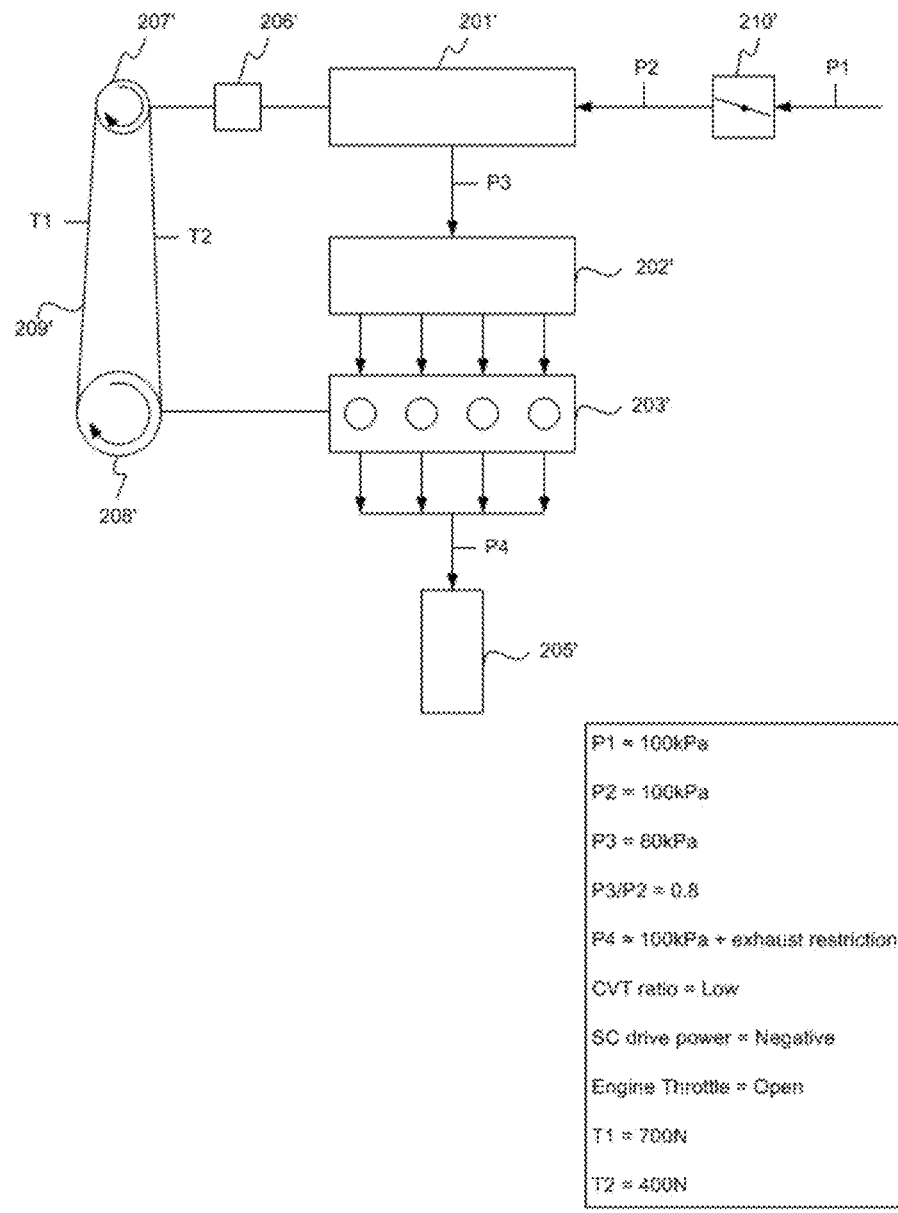
FIG. 2B is an example of an engine system with an open upstream throttle valve and supercharger throttling.
Figure 2C:
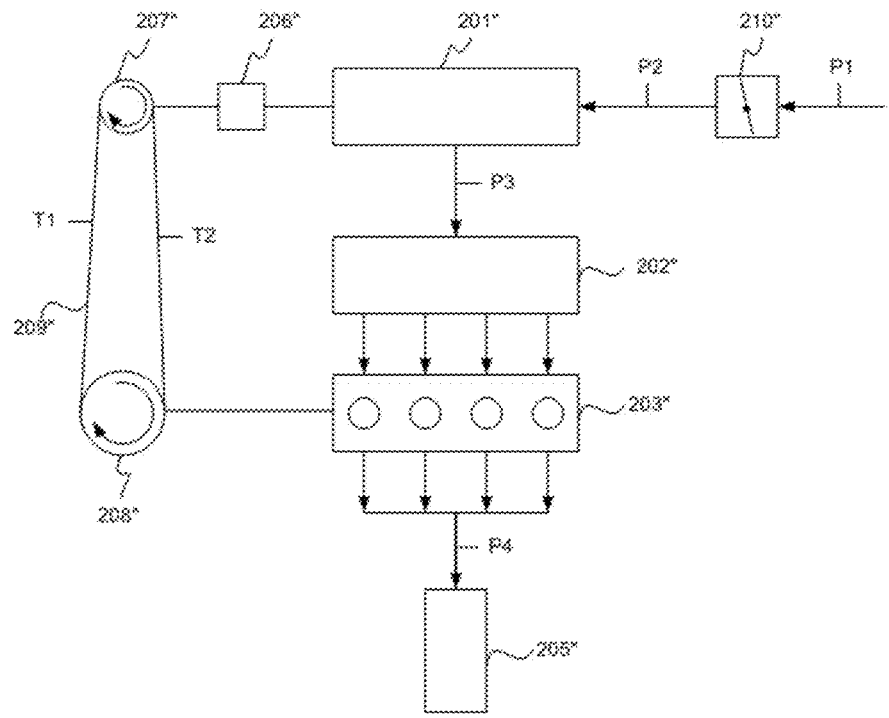
FIG. 2C is an example of an engine system with a partially closed upstream throttle valve and supercharger throttling.
Figure 2D:
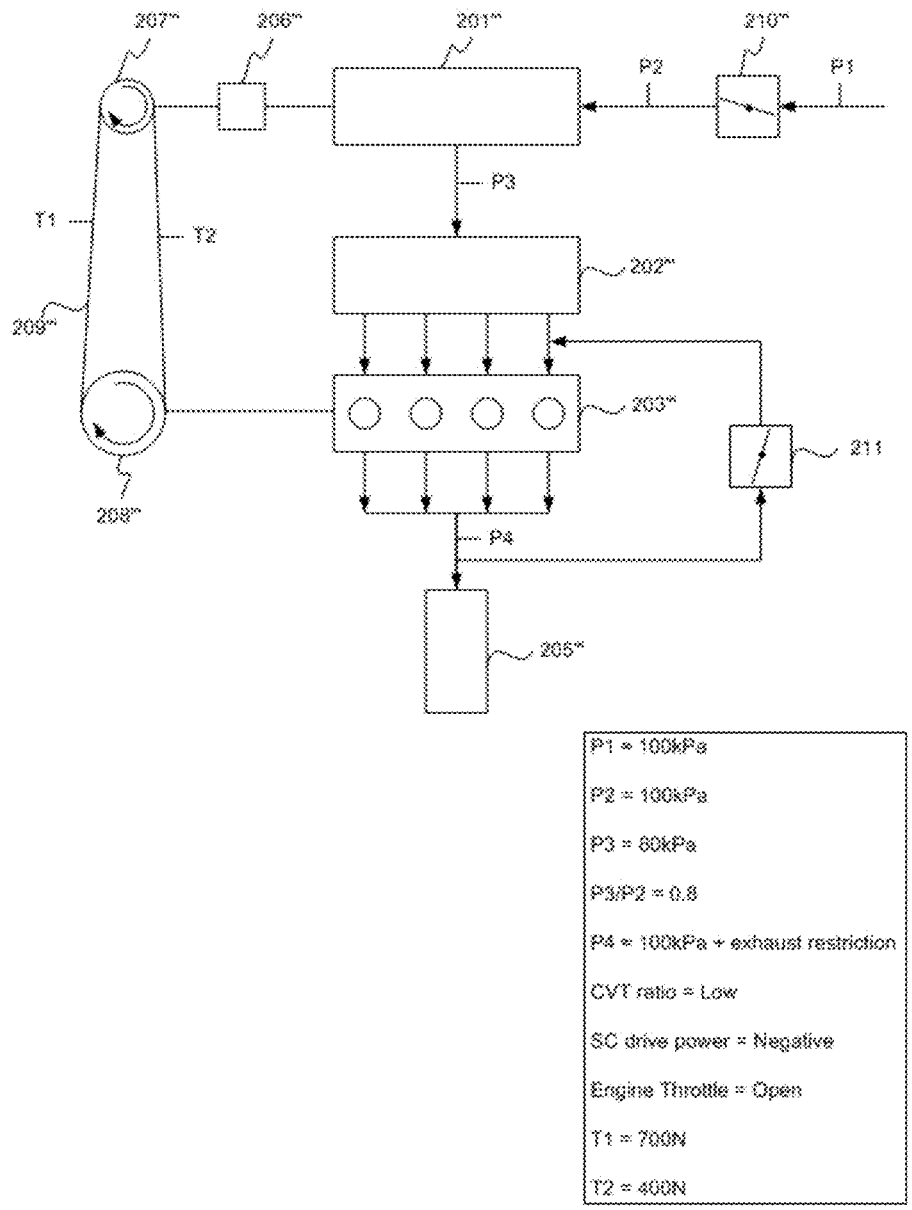
FIG. 2D is an example of an engine system with an open upstream throttle valve and an open exhaust gas recirculation (EGR) valve.
Figure 3A:
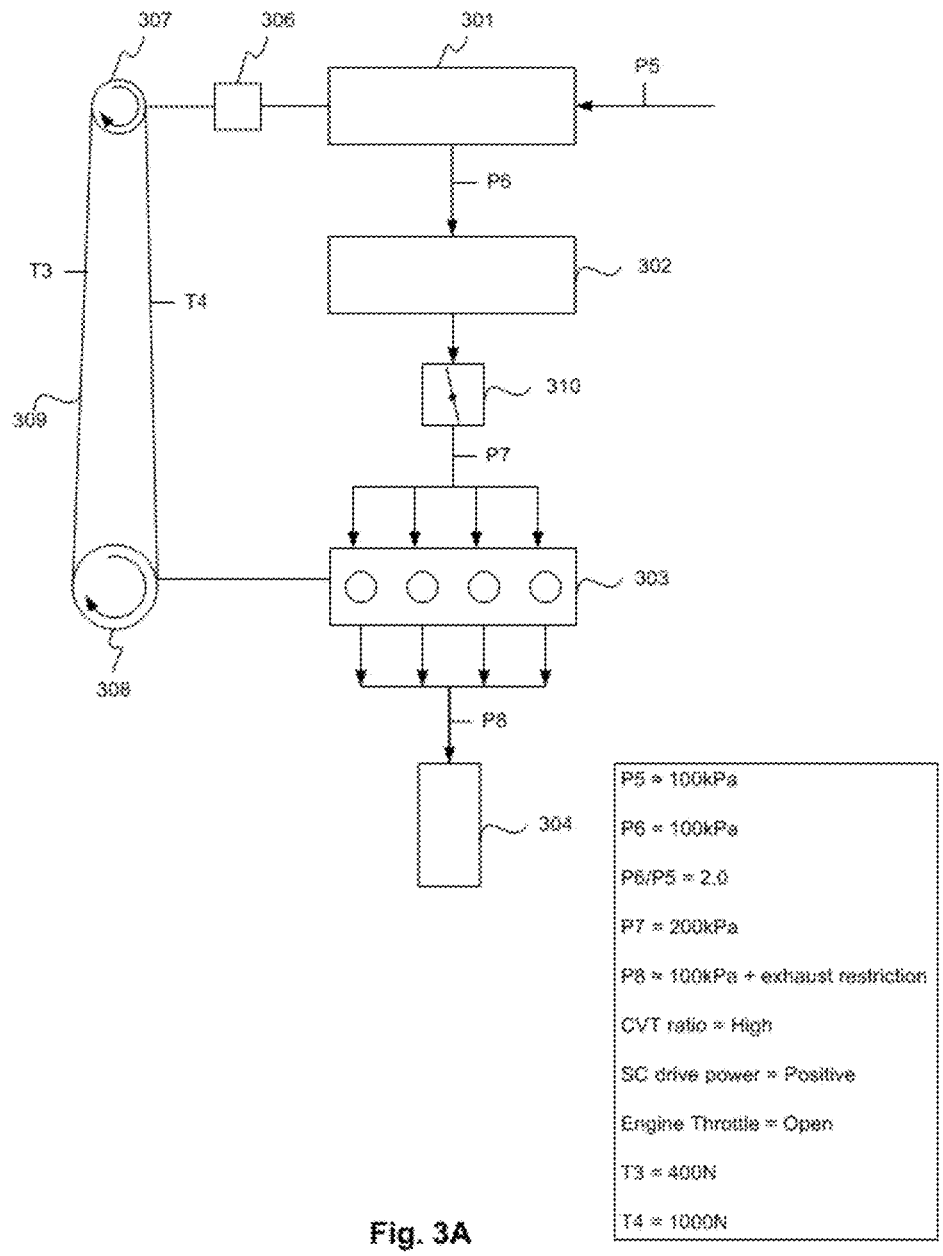
FIG. 3A is an example of an engine system with an open downstream throttle and a boosted air supply.
Figure 3B:
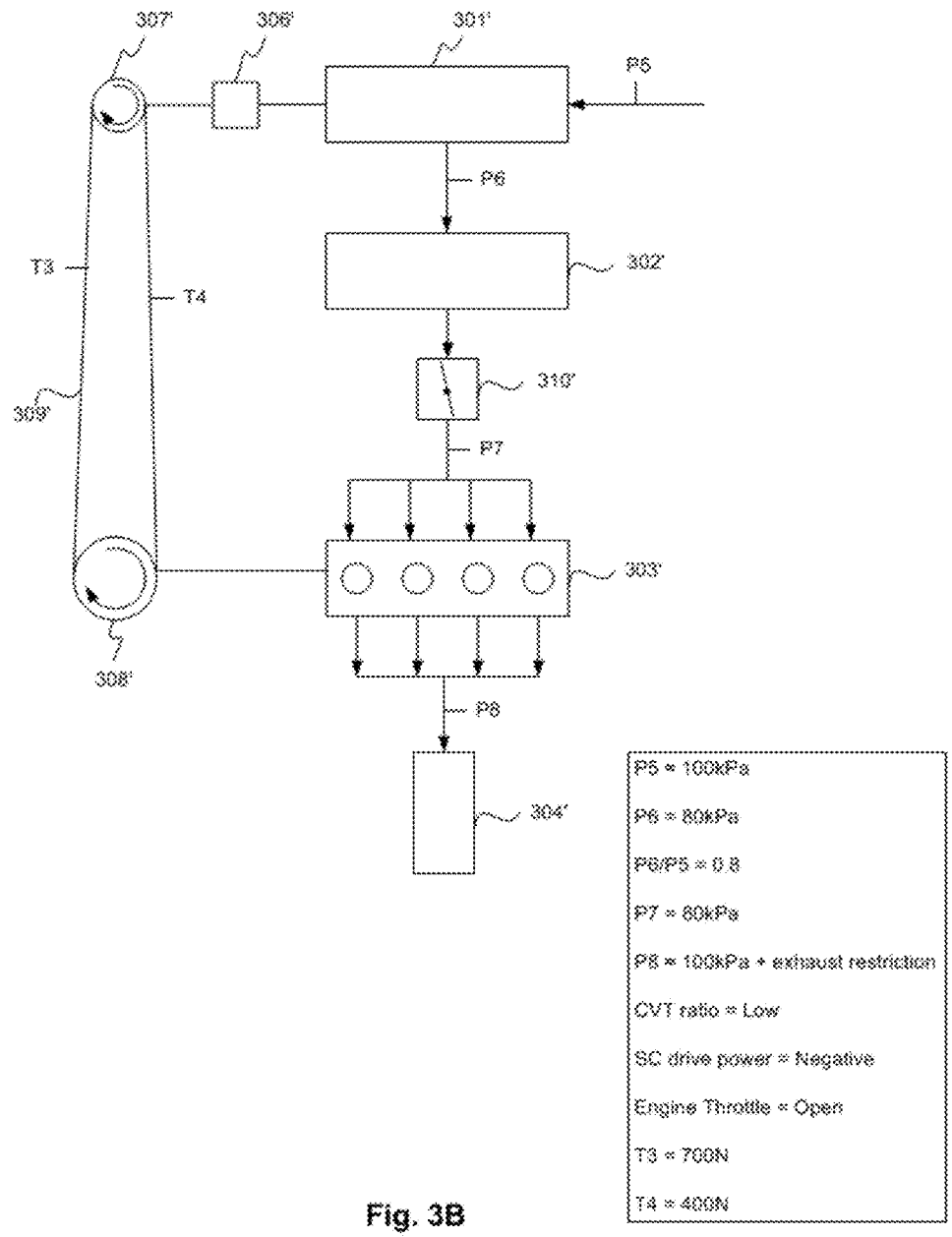
FIG. 3B is an example of an engine system with an open downstream throttle valve and supercharger throttling.
Figure 3C:
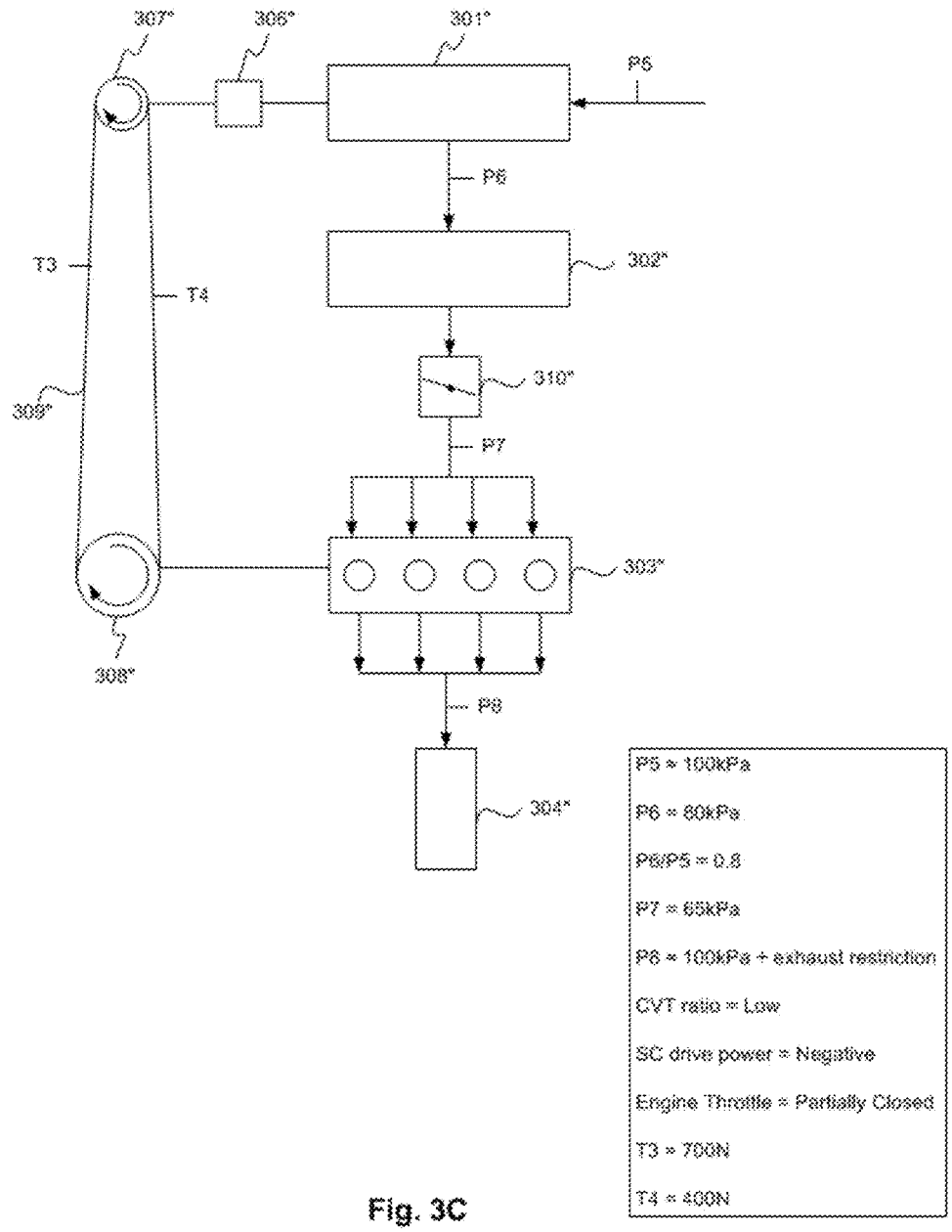
FIG. 3C is an example of an engine system with a partially closed downstream throttle valve and supercharger throttling.
Figure 3D:
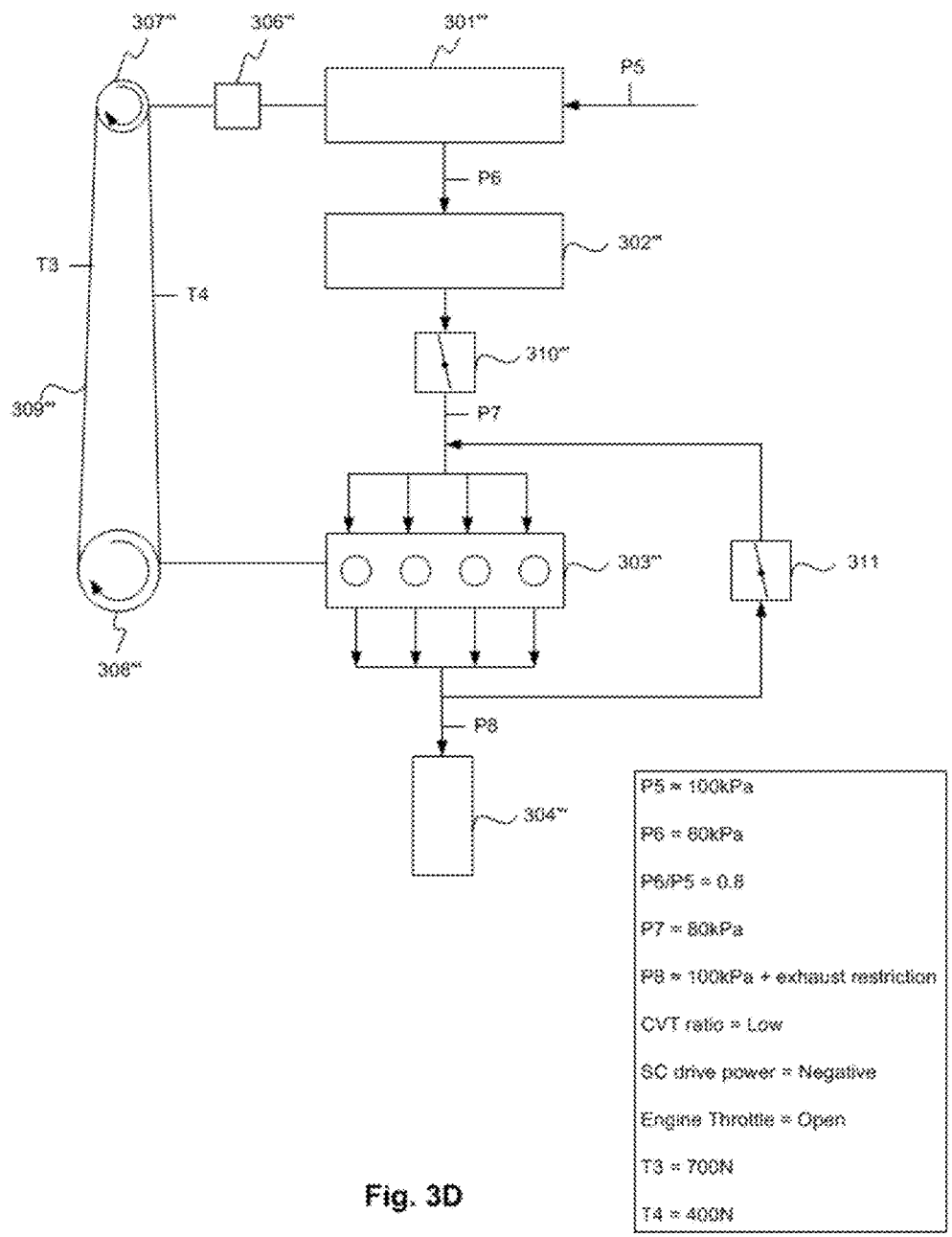
FIG. 3D is an example of an engine system with an open downstream throttle valve and an open EGR valve.

Because the fixed pulley ratio supercharger of Table 1 is driven at a fixed ratio, the limiting speed must be matched to Examples of torque energy transfer can be seen in FIGS. 2A-3D. FIGS. 2D and 3D also illustrate EGR benefits. The examples include supercharger 201, 201', 201", 201''', 301, 301', 301", and 301''', which is a positive displacement air pump comprised of parallel lobed rotors. The air flow volume, air flow rate, and air flow pressure can be controlled by selecting a supercharger of appropriate size and by controlling the motion of the rotors. While specific atmospheric pressures and ratios are shown in the examples, other values may be implemented by selecting one or more of a rotor speed, CVT setting, throttle valve position, engine size, supercharger size, pulley ratio, or engine speed. The system in each of FIGS. 2A-3D can achieve a range of positive and negative pressure values, in addition to the singular values shown, therefore allowing the system to operate under a wide range of load and environmental conditions. For example, the system may yield substantial low end torque and operate in high altitude areas.

The examples of FIGS. 2A-3D use a 0.57 L supercharger with a limiting speed of 20,000 RPMs. CVT 206, 206', 206", 206''', 301, 301', 301" and 301''' controls the speed of rotation of associated supercharger rotors and can be any one of a mechanical or electrical motor type, including, for example, toroidal, belt, planetary, and conical. While a belt and pulley type CVT is illustrated in FIGS. 2A-3D, other energy transferring or transmitting CVTs may also be used.

Engine 203, 203', 203", 203''', 303, 303', 303", and 303''' may be a combustion type for an automobile, or other motive device, and may comprise 4, 6, 8, or 12 cylinders. An inner crank shaft connects to connecting rods, for actuation by pistons associated with each cylinder. An oil sump, piston seals, and spark plugs are also included. Each cylinder has at least one valve for exchanging air, but may also have more valves, such as two air intake valves and two exhaust outlet valves. An intake manifold system may be associated with the air intake valves to distribute air and can comprise several air conduits, arranged in one example as one conduit for each air intake valve, or the manifold system can comprise a single distribution body. In addition, the exhaust outlet valves may have an associated exhaust manifold system comprising either an exhaust outlet conduit for each exhaust outlet valve, or a single distribution body.

Throttle valves 210, 210', 210", 210''', 310, 310', 310", and 310''' may be any art-recognized throttling mechanism for selectively restricting a volume of air flowing through a system, including, for example, a passage-way with a rotatable butterfly plate, or a passageway with a rotatable pass-through plate.

FIG. 2A illustrates an example of a relationship between a boosted state, belt 209 tension, and pressure measurements P1, P2, P3, and P4. Open throttle valve 210 receives air of approximate ambient pressure, for example P1=~100 kPa. Throttle valve 210 may optionally adjust the air pressure to atmospheric pressure. Supercharger 201 then receives positive drive power via CVT 206 to spin the rotors thereby intaking air of pressure P2=100 kPa and forcing it through the rotors and towards intercooler 202. Supercharger 201 creates a higher pressure airflow at P3, which can be P3=200 kPa, creating an effective pressure ratio of P3/P2=2.0.

CVT 206 is operating at a high transfer ratio to transfer a high amount of energy from engine 203 to supercharger 201. Belt 209, which traverses CVT pulley 207 and engine pulley 208, has a higher tension on an engine-pulling side than a tension on a supercharger-pulling side. As shown in the example, T1=400 N and T2=1000 N. That is, supercharger 201 draws torque power from engine 203 to create high pressure air at P3.

Air from intercooler 202 enters combustion chamber of engine 203, where it is used in the combustion process, and exits toward muffler 205. The exiting air is of pressure P4=~100 kPa plus pressure from exhaust restriction.

FIG. 2B illustrates an example having an engine throttle valve 210' upstream from supercharger 201'. Engine throttle valve 210' is open. While no boosting from supercharger 201' is needed, CVT 206' controls the speed of supercharger 201' so that supercharger 201' provides all of the engine throttling function. Therefore, supercharger 201' operates with negative drive power. That is, CVT 206' is a conduit to provide torque energy back to a crank shaft of engine 203'. CVT 206' operates with a low ratio, meaning the energy transfer from the crank shaft to the supercharger is lower than the energy transfer from the supercharger back to the crank shaft. Belt 209' assists with the energy transfer through its tensioning. As shown in FIG. 2B, belt 209' is tensioned across CVT pulley 207' and engine pulley 208'. The supercharger-pulling side of belt 209' has a tension T1=700 N, which is greater than tension T2=400 N on engine-pulling side of belt 209'. That is, supercharger 201' provides torque power to engine 203'.

In the example of FIG. 2B, a pressure drop occurs across supercharger 201. For example, air enters the system at ambient pressure, for example P1=~100 kPa. Throttle valve 210' may optionally adjust the air pressure to atmospheric pressure. Air then enters supercharger 201' at P2=100 kPa and exits at P3=80 kPa, for an effective pressure ratio of P3/P2=0.8. The reduced pressure air is cooled in optional intercooler 202' and is provided to engine 203'. After use in the combustion chamber, spent air enters optional muffler 205' at pressure P4=100 kPa plus additional pressure from exhaust restriction.

FIG. 2C illustrates an example having engine throttling function from both engine throttle valve 210" and supercharger 201". This combination creates a pressure drop at P2, and a second pressure drop at P3.

Engine throttle valve 210" is upstream from supercharger 201" and is partially closed. While no boosting from supercharger 201" is needed, CVT 206" controls the speed of supercharger 201" so that supercharger 201" provides a portion of the engine throttling function. The remainder of the throttling function is provided by throttle valve 210". A computer system having a processor and a memory with a stored control algorithm may assist with the extent of throttling provided by supercharger 201" and throttle valve 210".

Supercharger 201" operates with negative drive power. That is, CVT 206" is a conduit to provide torque energy back to a crank shaft of engine 203". CVT 206" operates with a low ratio, meaning the energy transfer from the crank shaft to the supercharger is lower than the energy transfer from the supercharger back to the crank shaft. Belt 209" is tensioned across CVT pulley 207" and engine pulley 208".

In the example shown, the supercharger-pulling side of belt 209" has a tension T1=600 N, which is greater than tension T2=400 N on engine-pulling side of belt 209". That is, supercharger 201" provides torque power to crank shaft of engine 203".

Also shown in the example, air enters the system at ambient pressure, or P1=~100 kPa. After being affected by throttle valve 210", air enters supercharger 201" at P2=80 kPa and exits at P3=65 kPa, for an effective pressure ratio of P3/P2=0.8. The reduced pressure air is cooled in optional intercooler 202" and is provided to engine 203". After use in the combustion chamber, spent air enters optional muffler 205" at pressure P4=100 kPa plus additional pressure from exhaust restriction.

FIG. 2D is a final example having a throttle valve 210''' upstream from supercharger 201'''. This example also includes an exhaust gas recirculation (EGR) valve 211. CVT 206''' controls the speed of supercharger 201''' so that supercharger 201''' provides all of the necessary engine throttling for this example. Engine throttle valve 210''' is upstream from supercharger 201''' and is open. Supercharger 201''' operates with negative drive power. That is, CVT 206''' is a conduit to provide torque energy back to a crank shaft of engine 203'''. CVT 206''' operates with a low ratio, meaning the energy transfer from the crank shaft to the supercharger is lower than the energy transfer from the supercharger back to the crank shaft. Belt 209''' is tensioned across CVT pulley 207''' and engine pulley 208'''. In this example, the supercharger-pulling side of belt 209''' has a tension T1=700 N, which is greater than tension T2=400 N on engine-pulling side of belt 209'''. That is, supercharger 201''' provides torque power to crank shaft of engine 203'''.

Air enters the system at ambient pressure P1=~100 kPa. Throttle valve 210''' may optionally adjust the air pressure to atmospheric pressure. Air then enters supercharger 201''' at P2=100 kPa and exits at P3=80 kPa, for an effective pressure ratio of P3/P2=0.8. The reduced pressure air is cooled in optional intercooler 202''' and is provided to engine 203'''. After use in the combustion chamber, used air exits towards optional muffler 205''' at pressure P4=100 kPa additional pressure from exhaust restriction. Some or all of the used air can either recirculate into the air stream entering engine 203''' via exhaust gas recirculation (EGR) valve 211, or some or all of the used air can exit the system through the muffler 205'''.

The EGR valve is useful for conditions when it is beneficial for exhaust gas to enter the intake manifold of engine 203'''. Intake manifold interposes intercooler 202''' and engine 203'''. Since air flows due to pressure differences, the lower pressure in the intake system encourages the air to flow from the nearly atmospheric pressure exhaust at P4 into the slightly below atmospheric pressure intake manifold.

FIGS. 3A-3D show examples where a throttle valve is downstream from a supercharger. FIG. 3A shows air at ambient pressure P5=~100 kPa entering supercharger 301. Supercharger 301 provides boosting, which increases the air pressure above atmospheric, and air exits at pressure P6, for example P6=200 kPa. In this example, the effective pressure ratio is P6/P5=2.0. The air then enters optional intercooler 302 and is supplied to open throttle valve 310. Air exiting throttle valve 310 is also at pressure P7=200 kPa, and is used in combustion engine 303. Used air exits engine 303 and enters optional muffler 304 at pressure P8=~100 kPa plus additional pressure from exhaust restriction.

CVT 306 is operating at a high transfer ratio to transfer a high amount of energy from crank shaft of engine 303 to a rotor drive shaft of supercharger 301. Belt 309, which traverses CVT pulley 307 and engine pulley 308, has a higher tension T4 on an engine-pulling side than a tension T3 on a supercharger-pulling side. For example, T4=1000 N and T3=400 N. That is, supercharger 301 draws torque power from engine 303 to create high pressure air at P6.

FIG. 3B shows an example of supercharger 301' providing engine throttling. The system does not require air boosting by supercharger 301', so CVT 306' controls the speed of supercharger 301' so that supercharger 301' provides all of the engine throttling function and so that the lobed rotors are slowed to create torque on the rotors. This torque is supplied, via the low transfer ratio on CVT 306', to crank shaft of engine 303'. Belt 309' spans CVT pulley 307' and engine pulley 308'. Tension T3 on a supercharger-pulling side of belt 309' is greater than tension T4 on engine-pulling side of belt 309'. In other words, the drive power of the supercharger 301' is negative. In the example shown, T3=700 N and T4=400 N.

Air at ambient pressure P5=~100 kPa enters supercharger 301'. Supercharger 301' has a negative pressure differential across it, and air exits at pressure P6=80 kPa, for an effective pressure ratio of P6/P5=0.8. The air then enters optional intercooler 302' and is supplied to open throttle valve 310'. Air exiting throttle valve 310' is at pressure P7=80 kPa, and is used in combustion engine 303'. Used air exits engine 303' and enters optional muffler 304' at pressure P8=~100 kPa plus additional pressure from exhaust restriction.

FIG. 3C illustrates an example of engine throttling by both supercharger 301" and throttle valve 310". Supercharger 301" does not provide all of the throttling function. Therefore, throttle valve 310" is partially closed to supply a portion of the throttling function for engine 303". A computer system having a processor and a memory with a stored control algorithm may assist with the extent of throttling provided by supercharger 301" and throttle valve 310".

The system does not require air boosting by supercharger 301", so CVT 306" controls the speed of supercharger 301" so that supercharger 301" provides a portion of the engine throttling function and so that the lobed rotors are slowed to create torque on the rotors. The torque from the rotors is supplied, via the low transfer ratio on CVT 306", to crank shaft of engine 303". Belt 309" spans CVT pulley 307" and engine pulley 308". In this example, tension T3=700 N on a supercharger-pulling side of belt 309" is greater than tension T4=400 N on engine-pulling side of belt 309". In other words, the drive power of the supercharger 301" is negative.

Air of pressure P5=~100 kPa enters supercharger 301". Supercharger 301" has a negative pressure differential across it, and air exits at pressure P6=80 kPa, for an effective pressure ratio of P6/P5=0.8. The air then enters optional intercooler 302" and is supplied to partially closed throttle valve 310". Air exiting throttle valve 310" is at pressure P7=65 kPa, and is used in combustion engine 303". Used air exits engine 303" and enters optional muffler 304" at a pressure P8=~100 kPa plus additional pressure from exhaust restriction.

FIG. 3D illustrates an example of a downstream throttle with exhaust gas recirculation (EGR) where supercharger 301''' provides some or all of the throttling via speed control from CVT 306'''. Supercharger 301''' operates with negative drive power. That is, CVT 306''' is a conduit to provide torque energy back to a crank shaft of engine 303'''. CVT 306''' operates with a low ratio, meaning the energy transfer from the crank shaft to the supercharger is lower than the energy transfer from the supercharger back to the crank shaft. Belt 309''' is tensioned across CVT pulley 307''' and engine pulley 308'''. In this example, the supercharger-pulling side of belt 309''' has a tension T3=700 N, which is greater than tension T4=400 N on engine-pulling side of belt 309'''. That is, supercharger 301''' provides torque power to crank shaft of engine 303'''.

Air enters supercharger 301''' at pressure P5=~100 kPa. Air exits at P6=80 kPa, for an effective pressure ratio of P6/P5=0.8. The reduced pressure air is cooled in optional intercooler 302''' and is provided to open throttle valve 310''' which passes the air to engine 303'''. After use in the combustion chamber, used air exits towards optional muffler 304''' at pressure P4=100 kPa plus additional pressure from exhaust restriction. The some or all of the used air can either recirculate into the air stream entering engine 303''' via exhaust gas recirculation (EGR) valve 311, or some or all of the used air can exit the system through the muffler 304'''.

The EGR valve is useful for conditions when it is beneficial for exhaust gas to enter the intake manifold of engine 303'''. Intake manifold interposes intercooler 302''' and engine 303'''. Since air flows due to pressure differences, the lower pressure in the intake system encourages the air to flow from the nearly atmospheric pressure exhaust at P4 into the slightly below atmospheric pressure intake manifold.

CVT 206, 206', 206'', 206''', 301, 301', 301'' and 301''' allows for precise control of the rotor speed, and therefore, also allows for precise control of the volume of air mass supplied for combustion. Because of the precise air mass control, no bypass valve is needed in the examples of FIGS. 2A-3D. Eliminating the bypass valve results in power savings for the example systems.

Figure 6:
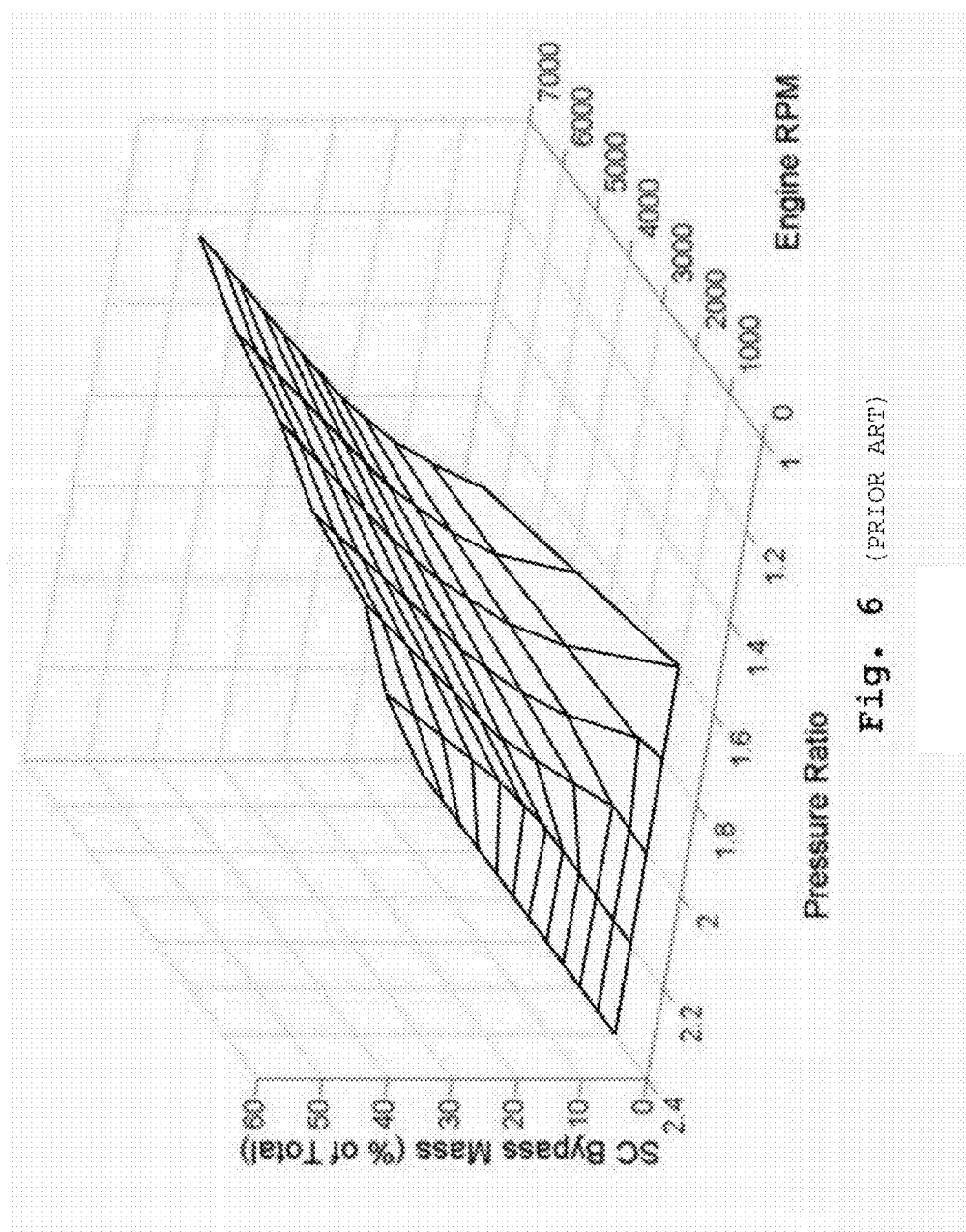
FIG. 6 is a graph showing an amount of air mass bypassed in the example of the prior art fixed pulley ratio supercharger arrangement.

FIG. 6 illustrates the percent of air mass bypassed in a prior art fixed pulley ratio 0.57 L supercharger with a 2 L engine. The prior art system is designed for optimal operation for only a portion of the operating range, which results in the intake of excess air mass for the remainder of the operating range. At low engine RPMs and high pressure ratio little or no air mass is bypassed. As the pressure ratio decreases and engine speed increases, the percentage of total air mass volume bypassed using the bypass valve increases. The bypassed air mass requires additional engine power to drive the prior art supercharger, as shown in FIG. 7.

When using a CVT drive instead of the fixed pulley ratio design, the supercharger spins faster at low engine speeds to increase boost, and spins slower at higher engine speeds to prevent overspeeding the supercharger. The engine power required for the CVT driven supercharger is shown in FIG. 8.

Figure 7:
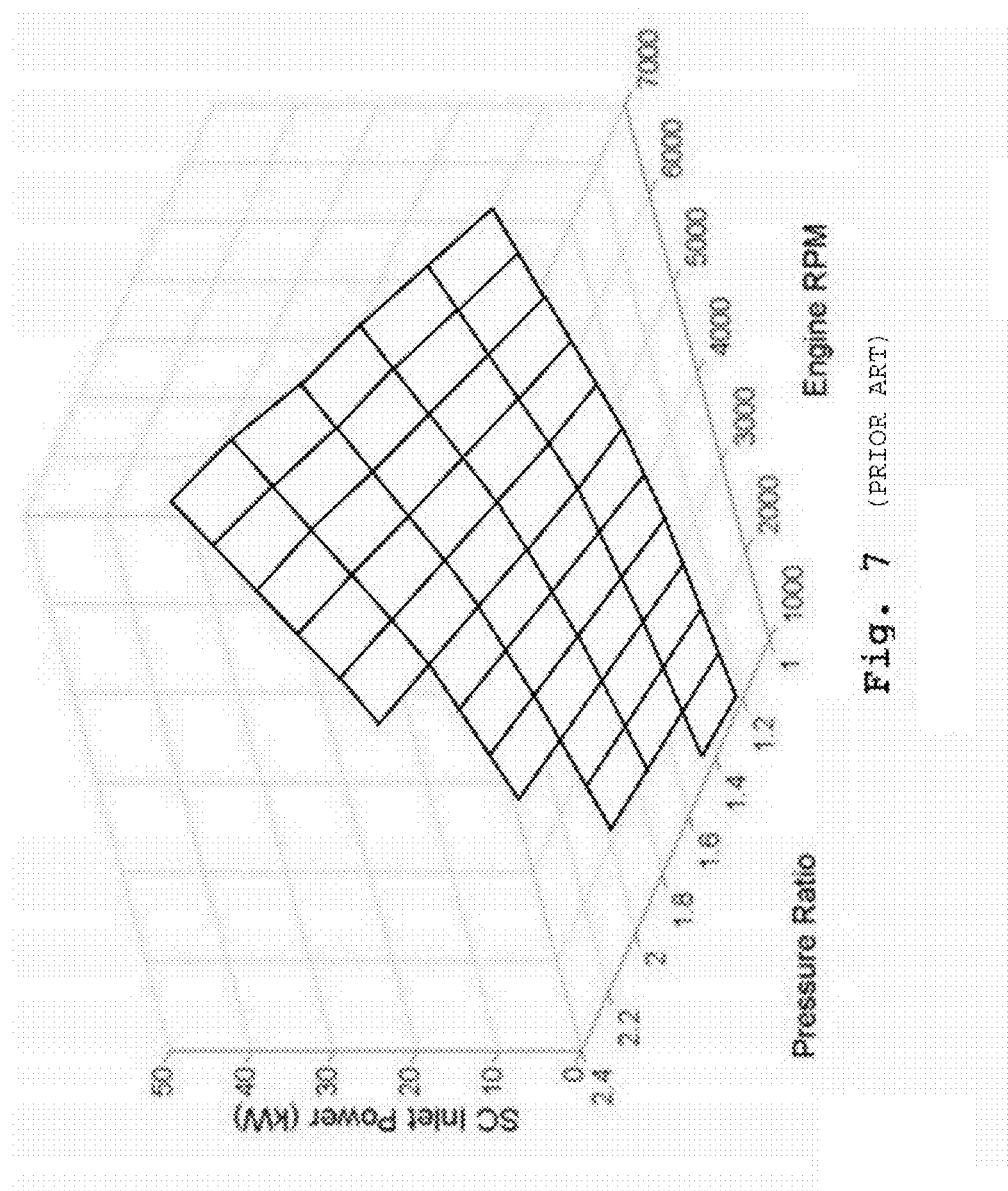
FIG. 7 is a graph of inlet power for the example of the prior art fixed pulley ratio supercharger arrangement.
Figure 8:
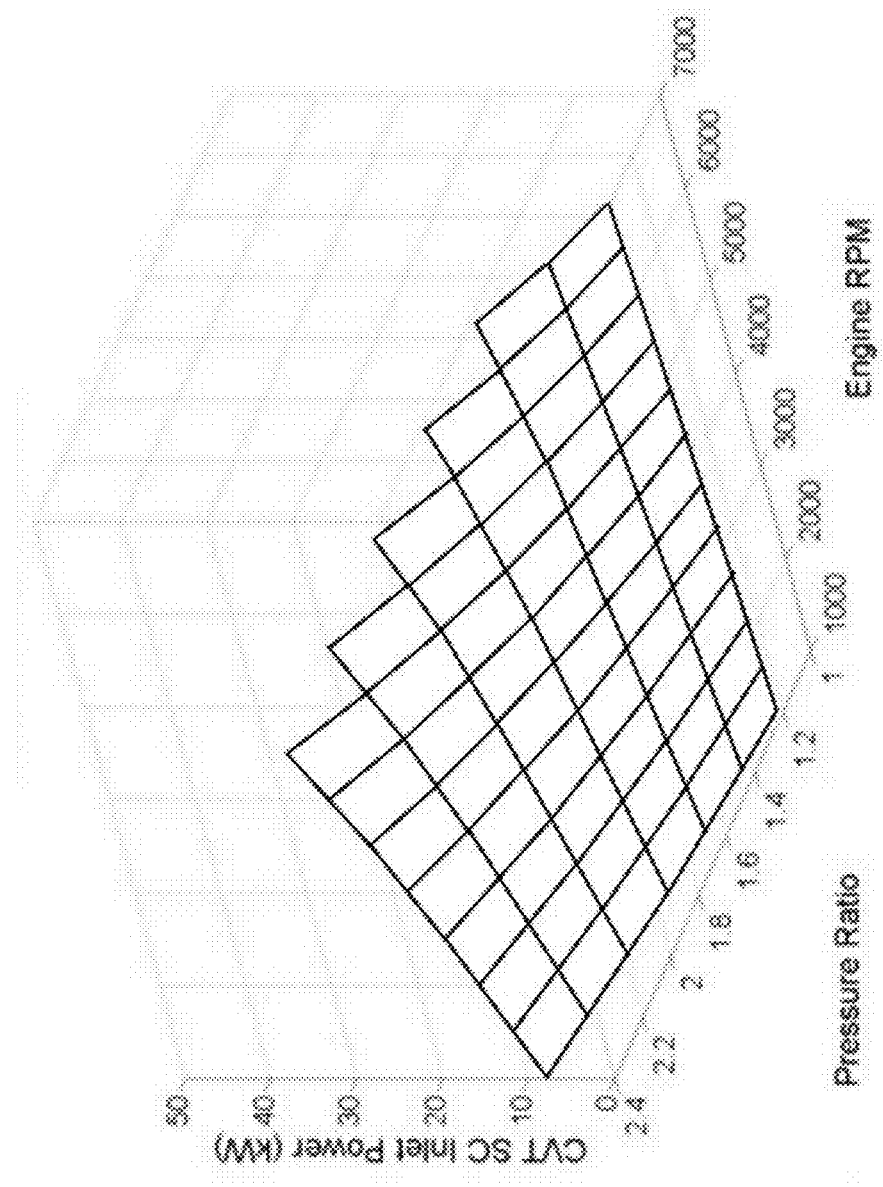
FIG. 8 is a graph of inlet power for the example of the CVT and supercharger arrangement.

Comparing FIGS. 7 and 8, the missing cells at the low engine speeds in FIG. 7 indicate that the prior art supercharger cannot provide a high pressure ratio for the air mass intake. However, the CVT driven supercharger of FIG. 8 can provide a high pressure ratio for the air mass intake over the entire engine operating range.

Figure 9:
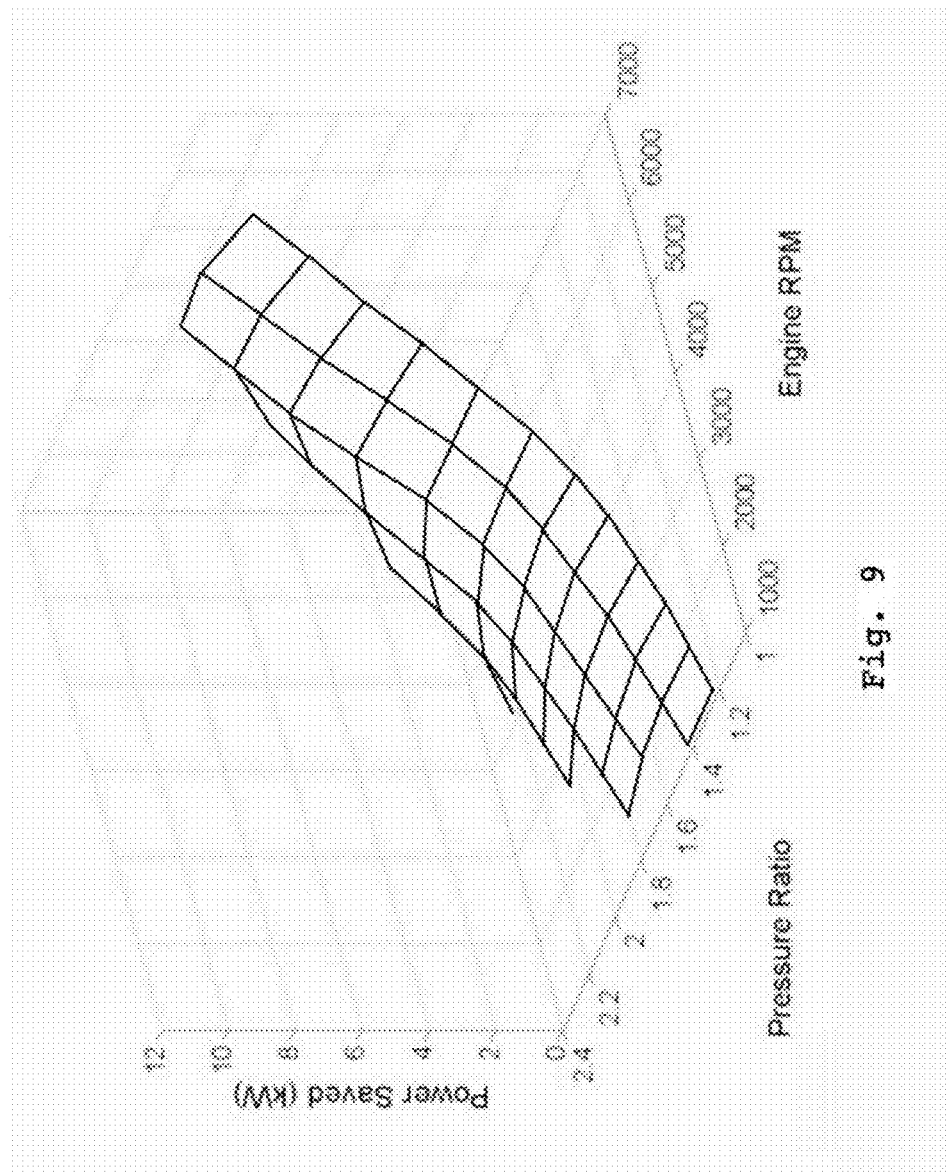
FIG. 9 is a graph of power savings for the example of the CVT and supercharger arrangement.

FIG. 9 illustrates the input power saved by operating the supercharger with a CVT drive instead of a fixed pulley ratio design. The input power savings with the CVT drive is approximately 3-5 kW at 4000-4500 engine RPMs and 1-1.5 kW at 2000-2500 RPMs under part load conditions. For a 2 L engine, the power savings translates in to an approximately 1-3% fuel economy gain at low to mid loads. The CVT driven supercharger enables the combined benefits of higher pressure ratios at low engine speeds (more "low end boost") and reduced supercharger input power.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. For example, other pressure values P1-P8 may be implemented to achieve other operating conditions. Also, belt tensions T1-T4 may be adjusted. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. An combustion system comprising:
a control system comprising a processor, a memory, an algorithm stored in the memory, and control electronics;
a positive displacement air pump comprising an air inlet, an air outlet, at least one rotor to move air from the air inlet to the air outlet, and a drive shaft connected to the rotor to rotate the rotor;
an engine comprising combustion chambers and an associated crank shaft; and
a continuously variable transmission (CVT) connected to the control system and further connected between the drive shaft and the crank shaft for transmitting a variable amount of rotational energy from the drive shaft to the crank shaft,
wherein the positive displacement air pump provides all throttling for the engine.

2. The combustion system of claim 1, further comprising:
an air intake system for supplying air to the combustion chambers, the air intake system comprising the positive displacement air pump; and
an air exhaust system for receiving air expelled from the combustion chambers,
wherein the air intake system does not comprise a bypass valve for bypassing air around the positive displacement air pump.

3. The combustion system of claim 1, wherein:
the combustion engine has an engine operating range from an idled condition up to a maximum rotations per minute (RPM) of the crank shaft,
the positive displacement air pump has a pump operating range from an idled condition up to a maximum RPM of the drive shaft, and
the control system controls the CVT such that the positive displacement air pump variably pumps air across the entire pump operating range as the engine operates across the entire engine operating range.

4. The combustion system of claim 1, wherein:
the combustion engine has an engine operating range from an idled condition up to a maximum rotations per minute (RPM) of the crank shaft,
the positive displacement air pump has a pump operating range from an idled condition up to a maximum RPM of the drive shaft, and
the control system controls the CVT such that the drive shaft of the positive displacement air pump is spun independent of the crank shaft RPM and dependent on variable engine airflow demands.

5. The combustion system of claim 1, wherein:
the combustion engine has a load operating range of the crank shaft from a low engine rotations per minute (RPM) up to a high engine RPM,
the positive displacement air pump has a boost operating range of the drive shaft from a high RPM high boost condition to a low RPM low boost condition, and
the control system controls the CVT such that the high boost condition occurs when the engine operates at the low engine RPM, and the low boost condition occurs when the engine operates at the high engine RPM.

6. A control system for controlling a positive displacement air pump to prevent backwards leaking of air flow, the system comprising:
a combustion engine comprising combustion chambers and a crank shaft, the crank shaft having a load operating range from a low engine rotations per minute (RPM) up to a high engine RPM, and the crank shaft having an engine operating range from an idled condition up to a maximum RPM;
a positive displacement air pump comprising rotors for displacing a volume of air to boost the combustion engine, the rotors affiliated with a drive shaft, the drive shaft having a boost operating range from a high RPM high boost condition to a low RPM low boost condition;

a continuously variable transmission (CVT) connected to rotate the drive shaft of the positive displacement air pump; and a processor, a memory, an algorithm stored in the memory, and control electronics, the algorithm, when executed by the processor, configured to execute the steps of:

controlling the CVT to substantially prevent backwards leaking of air in the positive displacement pump across the entire engine operating range; and controlling the CVT such that the high boost condition occurs when the engine operates at the low engine RPM, and the low boost condition occurs when the engine operates at the high engine RPM.

7. The control system of claim 6, further configured to execute the steps of:

selecting a volume of airflow to the engine that does not require the use of a by-pass valve; and controlling the CVT to rotate the drive shaft of the supercharger to selectively supply the volume of airflow to the engine.

8. An engine system, comprising:

a control system comprising a processor, a memory, an algorithm stored in the memory, and control electronics;

a positive displacement air pump comprising an air inlet, an air outlet, a rotatable drive shaft, and rotors associated with the drive shaft;

a combustion engine connected to receive air flow expelled from the positive displacement air pump, the combustion engine comprising combustion chambers and an associated rotatable crank shaft, the combustion engine (comprising) an operating range from an idled condition up to a maximum rotations per minute (RPM) of the crank shaft, the combustion engine comprising a plurality of airflow rates for each RPM in the operating range; and a continuously variable transmission (CVT) connected to the control system and comprising parts to variably transfer rotational energy to the drive shaft across the entire operating range of the combustion engine, and the CVT is controlled by the control system to rotate the drive shaft independent of the engine rotations per minute and dependent on variations in the engine airflow rates.

9. The engine system of claim 8, wherein:

the combustion engine has a load operating range of the crank shaft from a low engine RPM up to a high engine RPM, the positive displacement air pump has a boost operating range of the drive shaft from a high RPM high boost condition to a low RPM low boost condition, and the control system controls the CVT such that the high boost condition occurs when the engine operates at the low engine RPM, and the low boost condition occurs when the engine operates at the high engine RPM.

10. The combustion system of claim 1, wherein the control system controls the CVT and the positive displacement air pump provides more than one selectable quantity of air to the engine for at least one rotation speed of the crank shaft.

* * * * *